(12) United States Patent
Halder et al.

(10) Patent No.: US 7,703,355 B2
(45) Date of Patent: Apr. 27, 2010

(54) RECOILLESS HAMMER

(75) Inventors: Stefan Halder, Laupheim (DE); Dieter Hummel, Bad Waldsee (DE)

(73) Assignee: Erwin Halder KG, Achstetten (DE)

( * ) Notice: Subject to any disclaimer, the term of this patent is extended or adjusted under 35 U.S.C. 154(b) by 48 days.

(21) Appl. No.: 11/988,083

(22) PCT Filed: May 6, 2006

(86) PCT No.: PCT/DE2006/000780

§ 371 (c)(1),
(2), (4) Date: Dec. 27, 2007

(87) PCT Pub. No.: WO2007/000124

PCT Pub. Date: Jan. 4, 2007

(65) Prior Publication Data

US 2009/0078090 A1    Mar. 26, 2009

(30) Foreign Application Priority Data

Jun. 27, 2005   (DE) .................. 20 2005 010 158 U

(51) Int. Cl.
*B25D 1/12* (2006.01)
(52) U.S. Cl. ........................... 81/22; 403/227; 403/249; 403/268
(58) Field of Classification Search .............. 81/20, 81/22, 27; 403/227, 248–249, 267–268
See application file for complete search history.

(56) References Cited

U.S. PATENT DOCUMENTS

| 1,412,610 | A | * | 4/1922 | Foley ................... 403/379.3 |
| 2,067,751 | A | * | 1/1937 | Beegle .................. 403/227 |
| 2,656,225 | A |   | 10/1953 | Saylor |
| 3,018,140 | A |   | 1/1962 | Portz |
| 3,128,131 | A |   | 4/1964 | Bianchini |
| 3,129,737 | A | * | 4/1964 | Citroen ..................... 81/26 |
| 3,877,826 | A |   | 4/1975 | Shepherd |
| 4,118,258 | A |   | 10/1978 | Graveron |
| 5,259,274 | A | * | 11/1993 | Hreha ....................... 81/20 |
| 5,305,864 | A | * | 4/1994 | Strohm ................. 192/107 C |
| 5,896,788 | A | * | 4/1999 | Hreha et al. ............... 81/20 |
| 6,739,218 | B2 |  | 5/2004 | Yang |

FOREIGN PATENT DOCUMENTS

| EP | 0 088 268 | 9/1983 |
| EP | 0 615 819 | 9/1994 |
| GB | 1 199 739 | 7/1970 |

* cited by examiner

*Primary Examiner*—D. S Meislin
(74) *Attorney, Agent, or Firm*—Andrew Wilford

(57) ABSTRACT

The invention relates to a recoilless hammer which comprises a hammer head (2) having a handle seat (4) and a hammer handle (3) to be inserted in said handle seat (4). The handle seat (4) is completely covered in the peripheral direction by an elastic material (5). The end of the hammer handle (3) facing the handle seat (4) is provided with a metal sleeve (7) which is seated with its sleeve end (8) in the material (5) and which is provided with a sleeve collar (12) and, at its free end, with a chamfered section (13) for insertion between securing webs of the handle seat (4).

14 Claims, 3 Drawing Sheets

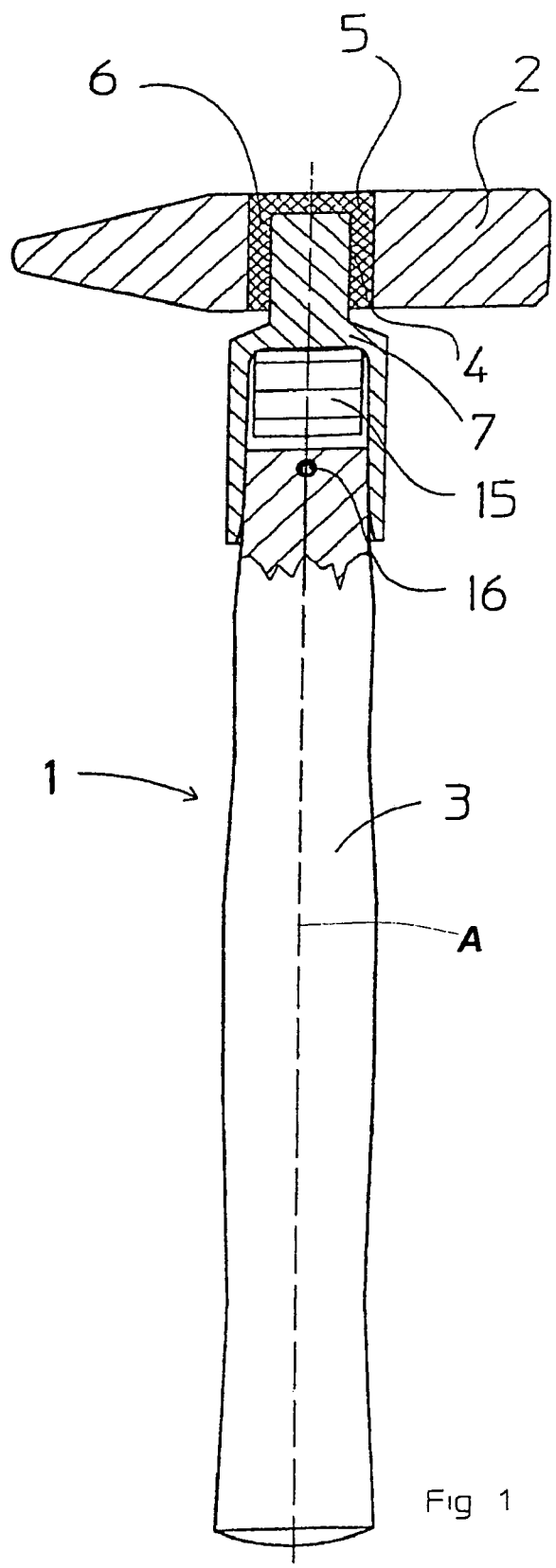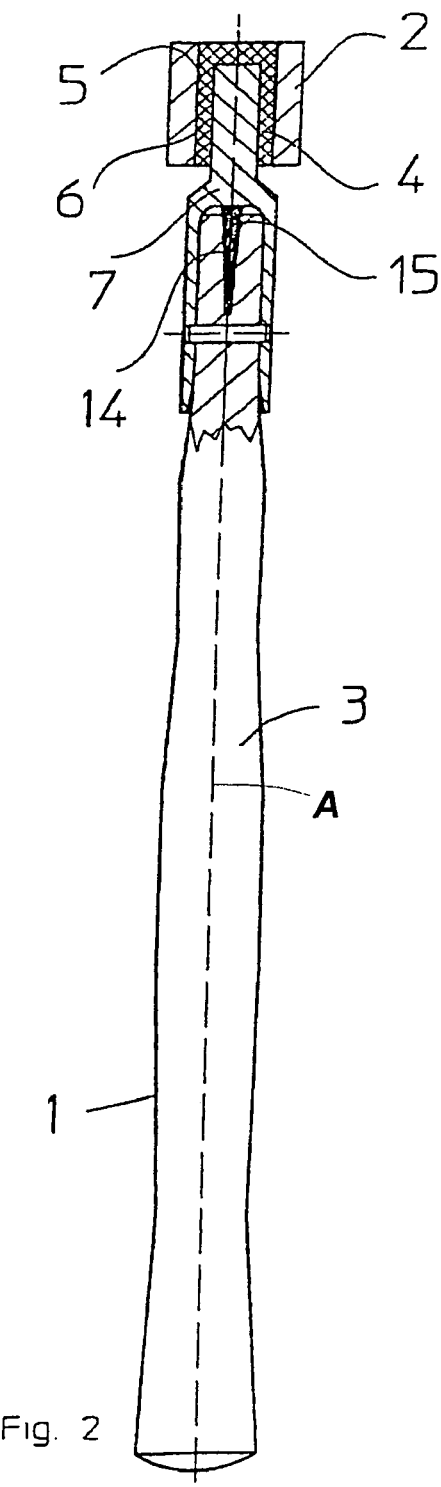

RECOILLESS HAMMER

CROSS REFERENCE TO RELATED APPLICATIONS

This application is the US national phase of PCT application PCT/DE2006/000780, filed 6 May 2006, published 4 Jan. 2007 as WO2007/000124, and claiming the priority of German patent application 202005010158.3 itself filed 27 Jun. 2005, whose entire disclosures are herewith incorporated by reference.

FIELD OF THE INVENTION

The invention relates to a recoilless hammer comprising a hammer head having a handle seat, and a hammer handle fittable into the handle seat, the handle seat being completely lined all around with an elastic material.

BACKGROUND OF THE INVENTION

Such recoilless hammers are widely used by professional tradesmen, since they allow a workpiece to be struck without a strong recoil. This very powerful compensation, or even complete elimination, of the recoil is achieved, for example, by a design of the hammer head as a hollow structure in which is provided heavy shot, for example small metal balls that because of their inertia strike the front (in the striking direction) inner side of the hammer head with delay after the time when the outer striking surface of the hammer head strikes the workpiece, thereby transmitting a shock directed in the direction opposite the recoil to the hammer head which just compensates for the recoil. Such recoilless hammers have proven to be advantageous in practice, although technical development efforts have been made to provide recoilless hammers having solid hammer heads. To this end, U.S. Pat. No. 6,739,218 has proposed connecting the hammer head to the hammer handle via a pivot, a spring being provided between the hammer handle and the hammer head which counteracts rotation of the hammer head about the pivot relative to the hammer handle. A disadvantage of such a recoilless hammer is the unstable connection between the hammer head and the hammer handle, which leads to uncertainty by the user as to whether the hammer head is permanently connected to the hammer handle with load capability, or might represent a hazard.

OBJECT OF THE INVENTION

An object of the invention is to design a recoilless hammer of the above-described type in such a way that a recoil-compensating effect is achieved for a recoilless hammer having a solid, non-hollow hammer head, without the use of a rotary joint.

SUMMARY OF THE INVENTION

This object is achieved according to the invention in a recoilless hammer of the above-described type by the fact that on the end of the hammer handle facing the handle seat a metal sleeve is provided that has a solid sleeve head fitted in the elastic material in the handle seat, that the handle seat has holding ridges at two opposite sides, and that the sleeve head has recesses and, at its free end, a tapered portion.

Such a recoilless hammer has the primary advantage that it has the external appearance of a machinist hammer, familiar to one skilled in the art, where the hammer handle fits into the handle seat in the hammer head without the need for a pivot for the connection between the hammer head and the hammer handle. Since the handle seat is completely lined all around with the elastic material, the hammer head is able to move slightly relative to the hammer handle by making use of the elasticity, so that movement need not occur in a direction determined by a pivot axis, for example, and therefore compensation of the recoil occurs even when the hammer head strikes the workpiece at a small acute angle.

The metal sleeve increases the resistance of the hammer handle from being pulled out of the handle seat, since in this design a positive-fit connection is present between the metal sleeve and the hammer head that blocks movement of the sleeve head from the handle seat, and the tapered portion of the sleeve head allows the sleeve head of the metal sleeve to be fitted into the handle seat by suitably inclining the hammer handle.

In this regard it is practical for the elastic material to be made as a lining, i.e. to have an internal one-piece design all around.

One particularly preferred embodiment of the invention is characterized in that the lining is made of natural rubber, since this material is distinguished in particular by its ease of processing, has the necessary mechanical properties, and also has low susceptibility to aging degradation. These advantages are even more pronounced when the lining is made of neoprene, i.e. a rubber containing micropores. Alternatively, the lining may also be made of butyl.

It is also advantageous when the handle seat is made as a throughgoing hole, since this allows the hammer handle to pass through the handle seat and, the same as for machinist hammers, permits the user to visually check in a familiar manner the secure seating of the hammer handle in the handle seat.

To get a secure connection of the metal sleeve to the hammer handle, the inner walls of the metal sleeve also have a conical shape that tapers inward from the sleeve opening to the sleeve base.

Better protection of the metal sleeve from damage is provided when the lining surrounds the metal sleeve over its entire axial length, i.e. the elastic material completely encapsulates the metal sleeve, thereby protecting the hammer handle and the workpiece during imprecise hammer blows.

To further secure the connection between the hammer handle and the hammer head, a wedge seat is provided at the end of the hammer handle facing the handle seat for accommodating a wedge, and the hammer handle is secured in the metal sleeve by a pin passing through the metal sleeve and the hammer handle.

Also within the scope of the invention, the outer surface of the metal sleeve has raised formations that provide a more secure connection of the metal sleeve to the elastic material.

One preferred embodiment that has cost advantages in manufacturing is characterized in that the lining is injection-molded and surrounds the metal sleeve that together with the hammer handle is fitted in the handle seat.

To achieve the most permanent and load-bearing connection possible of the sleeve to the adjacent metal parts, the design is such that the lining and the hammer head form a first rubber-metal composite element by means of a rubber-metal binder, or that the lining and the metal sleeve form a second rubber-metal composite element by means of a rubber-metal binder. Advantageous binders have been available since 1960 under the trade name Chemosil.

BRIEF DESCRIPTION OF THE DRAWING

The invention is explained in greater detail with reference to embodiments illustrated in the drawings, in which:

FIG. 1 is a side view of a recoilless hammer, partially in section;

FIG. 2 is a rear view of the recoilless hammer from FIG. 1, partially in section;

SPECIFIC DESCRIPTION

Figure 3:
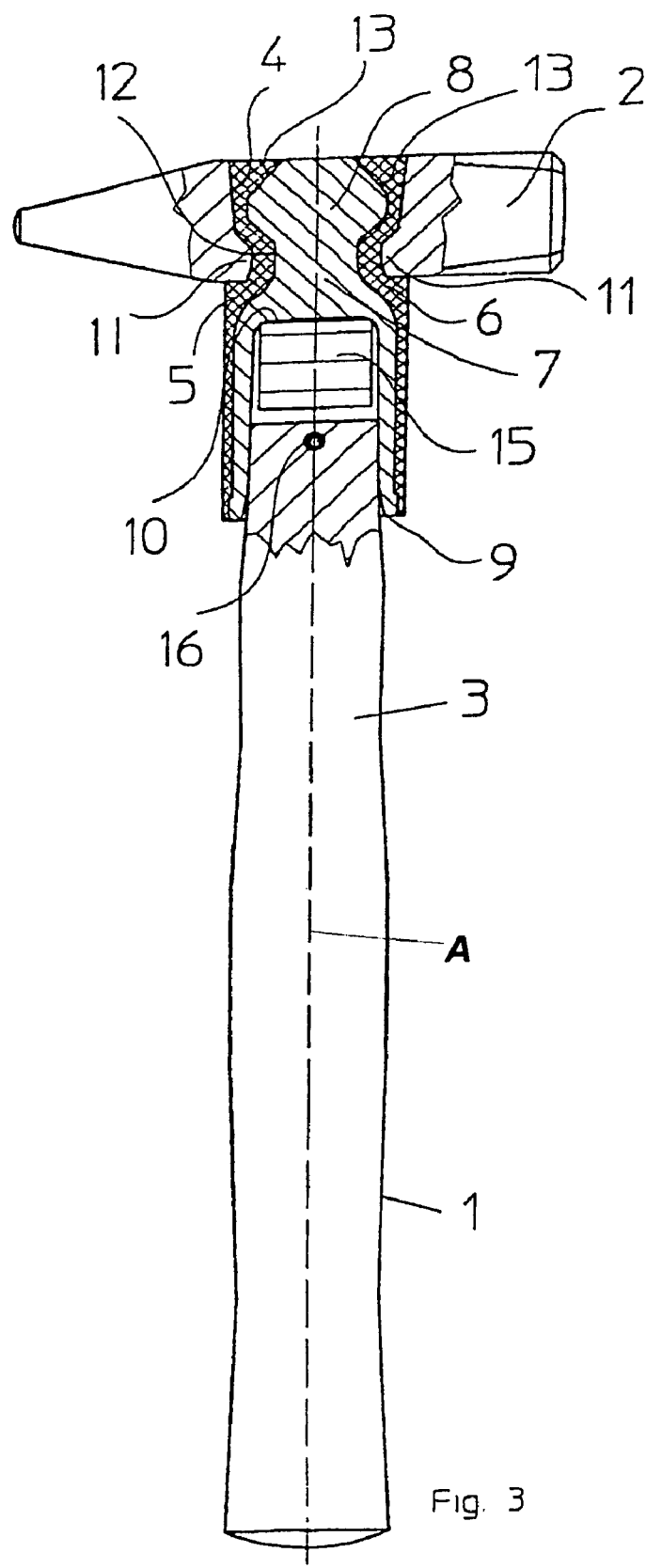
FIG. 3 shows another embodiment of the recoilless hammer according to the invention in a view like that of FIG. 1.

FIG. 1 shows a recoilless hammer 1 comprising a hammer head 2 and a hammer handle 3. The hammer head 2 has a handle seat 4 that is completely lined all around with an elastic material 5, i.e. a lining 6 made of elastic material that may be composed of natural rubber, neoprene, or another elastic material having the necessary mechanical properties.

Figure 4:
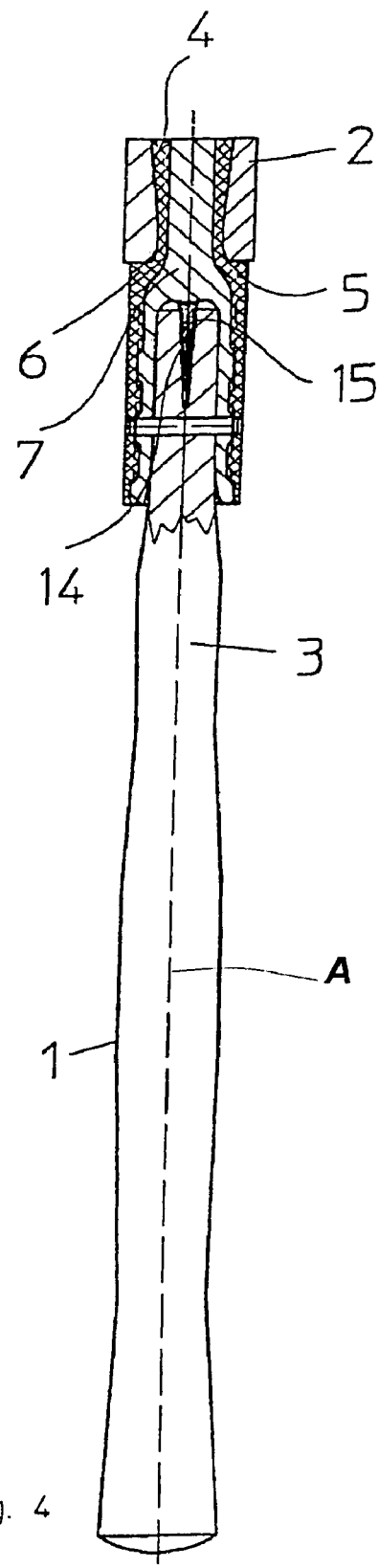
FIG. 4 shows a view like FIG. 2 of the recoilless hammer of FIG. 3.
Figure 5:
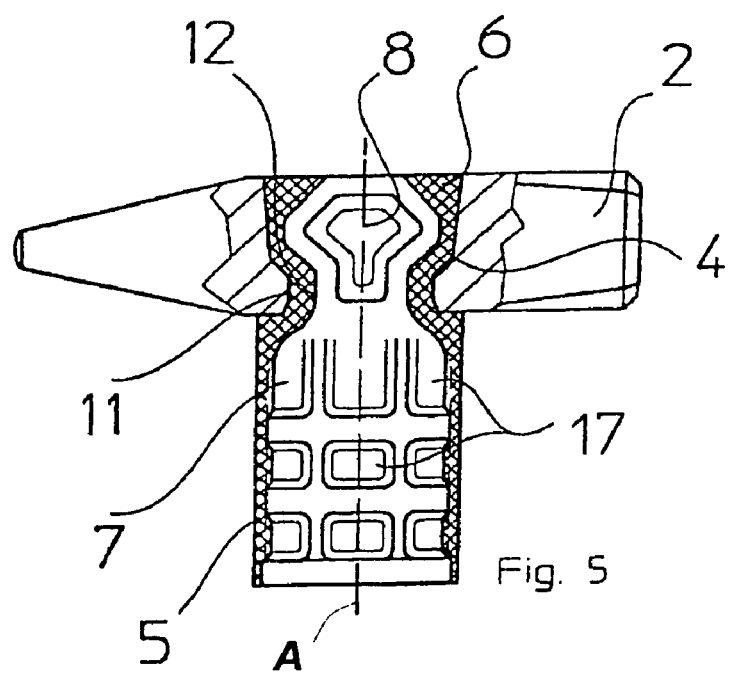
FIG. 5 shows a separate view of the hammer head together with the lining in the form of an injection-molded part enclosing the metal sleeve, showing also the surface of the metal sleeve.
Figure 6:
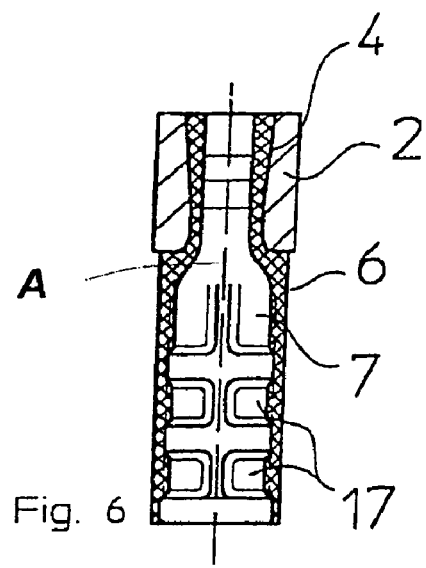
FIG. 6 is a section of the hammer head of FIG. 5 and the lining combined with a view of the surface of the metal sleeve.

FIGS. 3 and 4 show that the handle seat 4 is made as a throughgoing hole, and in all embodiments on the end of the hammer handle 3 facing the handle seat 4 there is a metal sleeve 7 that has a solid sleeve head 8 fitted in the lining 6 in the handle seat 4. The metal sleeve 7 is fabricated as a cast part.

The inner wall of the metal sleeve 7 has a conical shape that tapers inward from the sleeve opening 9 to the sleeve base 10 at an angle of approximately 1°. FIG. 3 further shows that the handle seat 4 has holding ridges 11 at two opposite sides, the sleeve head 8 having complementary recesses 12 and, at its free end, tapered portions 13. To achieve a high load-bearing connection between the hammer handle 3 and the metal sleeve 7, at the end of the hammer handle 3 facing the handle seat 4 a wedge seat 14 is provided for accommodating a wedge 15, and the hammer handle 3 is secured in the metal sleeve 7 by a pin 16 passing through the metal sleeve 7 and the hammer handle 3.

A tighter connection between the metal sleeve 7 and the lining 6 composed of the elastic material 5 is achieved in that the outer surface of the metal sleeve 7 has raised formations 17, and the lining and the metal sleeve 7 form a second rubber-metal composite element by means of a rubber-metal binder.

To produce the recoilless hammer 1 according to the invention, the wedge 15 is first fitted into the wedge seat 14, and the hammer handle 3 is then pressed into the metal sleeve 7 with great force so that the wedge 15 is driven into the wedge seat 14, thus securing the hammer handle 3 in the metal sleeve 7, helped by the pin 16. The metal sleeve 7 is then inserted into the throughgoing hole with a suitably inclined orientation of the sleeve head 8 with respect to the throughgoing hole, so that for a corresponding right-angle orientation of the hammer head 2 with respect to the hammer handle 3, as shown in FIG. 3, movement of the sleeve head 8 out of the throughgoing hole is blocked by the holding ridges 11. After the hammer handle 3 together with the metal sleeve 7 has assumed the correct position within the throughgoing hole, the lining 6 in the form of an injection-molded part is shaped around the metal sleeve 7, that is thus covered over its entire axial length. The composite element is formed by vulcanization, using the rubber-metal binder.

The finished recoilless hammer 1 represents a product that is similar to conventional machinist hammers, but that is also characterized by compensation of the recoil that is achieved by is temporary deformation of the lining 6, and the hammer head 2 can thus move with respect to the sleeve head 8 of the metal sleeve 7, and after the effect of the blow dies away the hammer head returns to its rest position.

The invention claimed is:

1. A recoilless hammer comprising:
   a hammer head having a throughgoing handle seat having holding ridges on two opposite sides;
   a hammer handle having an end juxtaposed with the handle seat,
   a metal sleeve on the end of the hammer handle facing the handle seat and having a solid sleeve head received spacedly within and extending a full depth of the seat, the sleeve head having an annular recess and on an outer free end an outwardly tapered to portion; and
   a layer of elastic material completely lining the handle seat, completely surrounding the solid sleeve head, and separating the sleeve head from an inner surface of the handle seat.

2. The recoilless hammer according to claim 1 wherein the lining is made of natural rubber.

3. The recoilless hammer according to claim 1 wherein the lining is made of neoprene.

4. The recoilless hammer according to claim 1 wherein the lining is made of butyl.

5. The recoilless hammer according to claim 1 wherein the handle seat is made as a throughgoing hole.

6. The recoilless hammer according to claim 1 wherein the metal sleeve is fabricated as a cast part.

7. The recoilless hammer according to claim 1 wherein a wedge seat is provided at the end of the hammer handle juxtaposed with the handle seat for accommodating a wedge.

8. The recoilless hammer according to claim 1 wherein the hammer handle is secured in the metal sleeve by a pin passing through the metal sleeve and the hammer handle.

9. The recoilless hammer according to claim 1 wherein the outer circumferential surface of the metal sleeve has raised formations.

10. The recoilless hammer according to claim 1 wherein the lining in the form of an injection-molded part surrounds the metal sleeve.

11. The recoilless hammer according to claim 1 wherein the layer and the hammer head form with a rubber-metal binder a rubber-metal composite element.

12. The recoilless hammer according to claim 1 wherein the layer and the metal sleeve form with a rubber-metal binder a rubber-metal composite element.

13. A recoilless hammer comprising
   a hammer head having a handle seat having holding ridges on two opposite sides;
   a hammer handle having an end juxtaposed with the handle seat;
   a layer of elastic material completely lining the handle seat; and
   a metal sleeve on the end of the hammer handle juxtaposed to with the handle seat and having a solid sleeve head fitted to the elastic layer lining the handle seat and having an annular recess, a free end of the metal sleeve having a tapered portion, the inner walls of the metal sleeve having a conical shape that tapers inward from a sleeve opening to a sleeve base.

14. A recoilless hammer comprising a hammer head having a handle seat having holding ridges on two opposite sides;

a hammer handle having an end juxtaposed with the handle seat;

a layer of elastic material completely lining the handle seat; and a metal sleeve on the end of the hammer handle juxtaposed to with the handle seat and having a solid sleeve head fitted to the elastic layer lining the handle seat and having an annular recess, a free end of the metal sleeve having a tapered portion, the layer surrounding the metal sleeve over the entire axial length thereof.

* * * * *